UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MAKING MAGNESIUM CHLORID AND THE LIKE.

1,359,782.  Specification of Letters Patent.  Patented Nov. 23, 1920.

No Drawing.  Application filed March 1, 1918.  Serial No. 219,755.

*To all whom it may concern:*

Be it known that I, EDWIN O. BARSTOW, a citizen of the United States, and a resident of Midland, county of Midland, State of Michigan, have invented a new and useful Improvement in Methods of Making Magnesium Chlorid and the like, of which the following is a specification, the principle of the invention being herein explained and the best mode in which I have contemplated applying that principle, so as to distinguish it from other inventions.

The object of the present invention is to provide an improved method or process for making magnesium chlorid, using dolomitic lime as the source of the magnesium. To the accomplishment of this and related ends, said invention, then, consists of the steps hereinafter fully described and particularly pointed out in the claims, the following description setting forth in detail certain steps embodying the invention, but such described steps constituting only one of the various ways in which the principle of the invention may be used.

As is well known dolomite consists of magnesium and calcium carbonates in combination as represented by the formula $MgCa(CO_3)_2$ or $MgCO_3.CaCO_3$. In the present process, slaked dolomitic lime is utilized, that is lime produced by burning such carbonates, and then treating with water, so as to form the corresponding hydroxids of magnesium and calcium, viz., $Ca(OH)_2$. $Mg(OH)_2$.

The first step in the process proper consists in treating such slaked dolomitic lime, or combined hydroxids, with sulfur dioxid ($SO_2$) and carbon dioxid ($CO_2$), either simultaneously, or successively, the carbon dioxid being used in a quantity equivalent to the calcium in the lime, and the sulfur dioxid, in a quantity equivalent to the magnesium in the lime. The result is a mixture of calcium carbonate and magnesium sulfite suspended in water, as indicated by the following reaction:—

$$Ca(OH)_2.Mg(OH)_2 + SO_2 + CO_2 = CaCO_3 + MgSO_3 + 2H_2O.$$

I then add calcium chlorid to such mixture, which forms magnesium chlorid and calcium sulfite according to the following reaction:—

$$MgSO_3 + CaCl_2 = CaSO_3 + MgCl_2.$$

It will be understood that the calcium carbonate does not react, but remains inert in this last described step, the object in introducing the carbon dioxid being to form such inert compound, and thus serve to prevent absorption of sulfur dioxid by the calcium, thereby saving a corresponding quantity of sulfur.

Even if the first reaction be not entirely realized, *i. e.*, if some magnesium carbonate is formed, this will react with the calcium chlorid used in the next step, although more slowly, the reaction here being $$MgCO_3 + CaCl_2 = CaCO_3 + MgCl_2.$$

In other words, to the extent that the sulfur dioxid is selectively absorbed by the magnesium hydroxid, the subsequent reaction is facilitated and the process as a whole correspondingly speeded up. The formation of calcium sulfite in the first step, of course, does not interfere with the conversion of either the magnesium sulfite or carbonate to magnesium chlorid, but merely means the waste of that much sulfur.

The magnesium chlorid thus produced is then separated from the calcium carbonate and freshly precipitated calcium sulfite, which is likewise substantially insoluble, giving a clear solution of the chlorid. The magnesium chlorid solution thus left may then be evaporated down until it corresponds in composition to magnesium chlorid with water of crystallization as represented by the formula ($MgCl_2 6H_2O$), when it may be drawn off into drums and allowed to cool and solidify. Where, on the other hand, it is desired to produce magnesium carbonate, or the like, it is not necessary to evaporate the solution of the chlorid, but such carbonate may be precipitated directly from the brine by means of sodium carbonate and then be separated from the residual liquor by filtration and washing.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The method of making magnesium chlorid, which consists in treating slaked dolomitic lime with sulfur dioxid and carbon dioxid; and then adding calcium chlorid to the resulting mixture.

2. The method of making magnesium chlorid, which consists in treating slaked dolomitic lime with sulfur dioxid and carbon dioxid in amounts approximately equivalent to the magnesium and calcium respectively present in such lime; and then adding calcium chlorid to the resulting mixture.

3. In a method of making magnesium chlorid from dolomitic lime, the steps which consist in slaking such lime; treating such lime with sulfur dioxid and a substance preferentially reacting with the calcium to form a precipitate thereof, whereby such sulfur dioxid is left to react with the magnesium; and then adding calcium chlorid, whereby calcium sulfite is precipitated and magnesium chlorid left in solution.

Signed by me, this 21st day of February, 1918.

EDWIN O. BARSTOW.

Attested by—
ARTHUR N. PATRIARCKE,
JNO. F. OBERLIN.